(12) United States Patent  
Waibel et al.

(10) Patent No.: US 11,027,739 B2  
(45) Date of Patent: Jun. 8, 2021

(54) METHOD AND CONTROL DEVICE FOR OPERATING A POWER TAKEOFF

(71) Applicant: ZF Friedrichshafen AG, Friedrichshafen (DE)

(72) Inventors: Anton Waibel, Friedrichshafen (DE); Dieter Strak, Immenstaad am Bodensee (DE); Wolfgang Schmid, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/650,040

(22) PCT Filed: Aug. 29, 2018

(86) PCT No.: PCT/EP2018/073199  
§ 371 (c)(1),  
(2) Date: Mar. 24, 2020

(87) PCT Pub. No.: WO2019/063231  
PCT Pub. Date: Apr. 4, 2019

(65) Prior Publication Data  
US 2020/0231157 A1  Jul. 23, 2020

(30) Foreign Application Priority Data

Sep. 28, 2017  (DE) .................... 10 2017 217 323.8

(51) Int. Cl.  
*B60W 30/188* (2012.01)  
*B60K 25/06* (2006.01)  
*B60W 10/11* (2012.01)

(52) U.S. Cl.  
CPC ......... *B60W 30/1888* (2013.01); *B60K 25/06* (2013.01); *B60W 10/11* (2013.01)

(58) Field of Classification Search  
CPC .... B60W 30/1888; B60W 10/11; B60K 25/06  
See application file for complete search history.

(56) References Cited

U.S. PATENT DOCUMENTS 4,811,804 A     3/1989  Ewers et al.  
6,658,339 B1 *  12/2003  Wright .................... F16H 59/02  
                                                         180/170

(Continued)

FOREIGN PATENT DOCUMENTS

DE          196 35 200 A1    3/1998  
DE    10 2005 037 751 A1    2/2007

(Continued)

OTHER PUBLICATIONS

German Search Report Corresponding to 10 2017 217 323.8 dated Jun. 18, 2018.

(Continued)

*Primary Examiner* — Tisha D Lewis  
(74) *Attorney, Agent, or Firm* — Finch & Maloney PLLC; Michael J. Bujold

(57) ABSTRACT

A method for operating an auxiliary power take-off (5) in a drive-train of a motor vehicle with at least a drive aggregate (1) and with a transmission (2) connected between the drive aggregate (1) and an axle drive (4). To operate the power take-off (5,) a transmission gear is engaged in the transmission (2). During an uninterrupted operation of the power take-off (5), after lapse of a defined time period, an automatic shift to a protective gear is carried out in the transmission (2).

11 Claims, 1 Drawing Sheet

(56) References Cited

U.S. PATENT DOCUMENTS

| | | | | |
|---|---|---|---|---|
| 8,417,426 B2* | 4/2013 | Vermeulen | ............ | B60W 10/30 |
| | | | | 701/50 |
| 2008/0194383 A1* | 8/2008 | Berglund | .............. | B60W 10/02 |
| | | | | 477/97 |
| 2008/0234102 A1* | 9/2008 | Karlsson | ................ | B60K 25/06 |
| | | | | 477/115 |
| 2013/0040781 A1* | 2/2013 | Mair | ................... | F16H 61/0213 |
| | | | | 477/99 |
| 2017/0198809 A1* | 7/2017 | Omran | ................ | F16H 61/0204 |

FOREIGN PATENT DOCUMENTS

| | | |
|---|---|---|
| DE | 10 2013 110 315 A1 | 3/2015 |
| DE | 10 2014 225 501 A1 | 6/2016 |
| DE | 10 2015 215 468 A1 | 2/2017 |
| WO | 2003/030069 A1 | 3/2007 |

OTHER PUBLICATIONS

International Search Report Corresponding to PCT/EP2018/073199 dated Nov. 29, 2018.
Written Opinion Corresponding to PCT/EP2018/073199 dated Nov. 29, 2018.

* cited by examiner

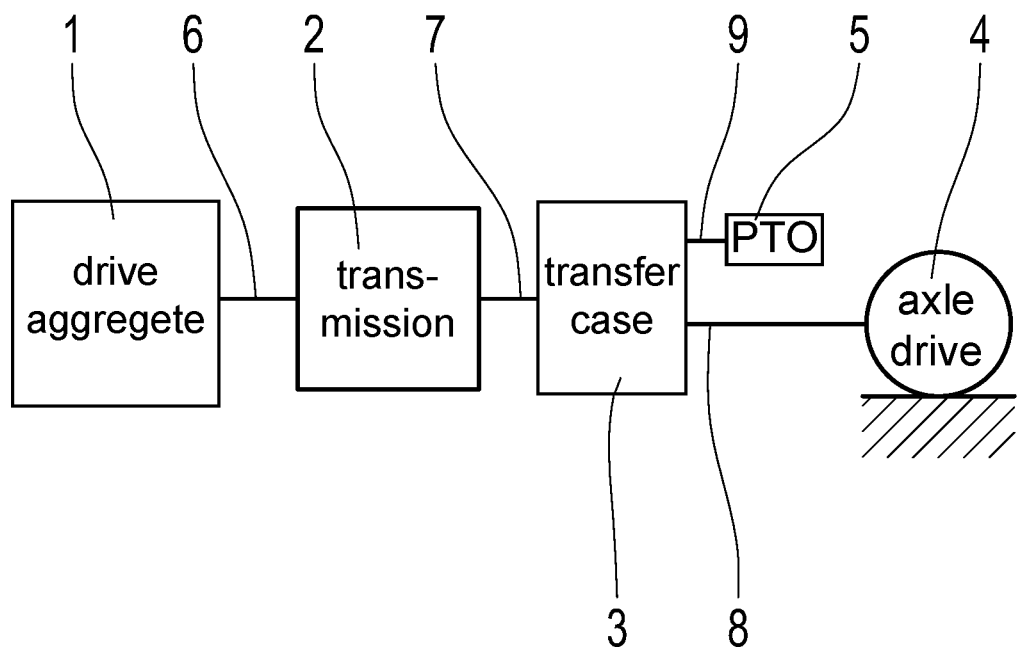

METHOD AND CONTROL DEVICE FOR OPERATING A POWER TAKEOFF

This application is a National Stage completion of PCT/EP2018/073199 filed Aug. 29, 2018, which claims priority from German patent application serial no. 10 2017 217 323.8 filed Sep. 28, 2017.

FIELD OF THE INVENTION

The invention relates to a method for operating a power take-off in a drive-train of a motor vehicle. In addition the invention also relates to a control device for carrying out the method and to a corresponding computer program product.

BACKGROUND OF THE INVENTION

A motor vehicle, designed as a utility vehicle, has a drive aggregate, a transmission, an axle drive and at least one auxiliary power take-off, wherein the transmission is connected between the drive aggregate and the axle drive. An auxiliary power take-off is also denoted as a PTO. In particular, transmissions of utility vehicles often comprise power take-offs by means of which auxiliary units of the utility vehicle concerned are connected to an auxiliary output of the transmission and can thereby be operated. In such cases, during the operation of these auxiliary power take-offs a corresponding drive torque is tapped via the auxiliary power take-off. To be able to switch the auxiliary power take-off on and off as necessary, a shifting element is usually associated with the auxiliary power take-off, such shifting elements usually being in the form of interlocking shifting elements such as claw-type clutches.

If such an auxiliary power take-off is, for example, a pump connected to the drive output of the transmission for the extinguishing water of a fire-fighting vehicle, the operating time of the power take-off can amount to only a few minutes or even several hours. If the power take-off is operated at the same operating point for several hours, this can result in shortening the life of or even damaging the transmission, since the transmission elements such as gearwheels, disks or bearings involved in the power flow are stressed over a long period of time. Due to the continual loading, the transmission elements arrange themselves relative to one another and over a longer period of time the same mechanical points of the transmission elements are always subjected to the loading. The continual loading can also induce mechanical play between the transmission elements. This can result in more rapid wear of, or even damage to the transmission elements.

DE 10 2005 037 751 A1 discloses a drive input for an agricultural vehicle. To provide sufficient power for simultaneous driving propulsion and an auxiliary power take-off as well, the drive engine is designed such that it can be operated with at least two power characteristics. The second power characteristic, with which the drive engine delivers a higher power, is needed for the simultaneous operation of the auxiliary power take-off and the driving propulsion. The first power characteristic is as a rule used when the auxiliary power take-off is switched off, in order not to overload the power unit. According to DE 10 2005 037 751 A1 the higher power of the drive engine is only permitted when the power unit would actually be overloaded.

SUMMARY OF THE INVENTION

Starting from the prior art described above, the purpose of the present invention is to provide a new type of method for operating an auxiliary power take-off in a drive-train of a motor vehicle. In addition a control device designed to carry out the method and a computer program product for carrying out the method are indicated.

From the standpoint of method technology this objective is achieved, starting from the preamble of the independent claim(s), in combination with its characterizing feature. A control device for operating an auxiliary power take-off of a motor vehicle transmission is in addition the object of the independent claims(s). Regarding a computer program product, reference is made to the independent claim(s). Advantageous further developments are the object of the subordinate claims and of the description that follows.

A method is proposed for the operation of an auxiliary power take-off in a drive-train of a motor vehicle. The drive-train comprises at least a drive aggregate, an axle drive and a transmission connected between the drive aggregate and the axle drive. To operate the auxiliary power take-off, in the transmission a gear is engaged and the power take-off is coupled to an auxiliary power take-off shaft of the transmission by way of a shifting element, which can be an interlocking shifting element or a frictional shifting element.

Furthermore, in the drive-train of the motor vehicle, between the transmission and the axle drive a transfer case can be arranged, with the transmission drive output shaft of the transmission connected to a transmission input shaft of the transfer case. The transfer case then has a transmission drive output shaft, which is connected to the axle drive, and a power take-off shaft connected to the auxiliary power take-off.

The auxiliary power take-off is preferably in the form of a stationary power take-off, i.e. while the motor vehicle is at rest an auxiliary unit can still be operated by way of the power take-off. The transmission drive output shaft of the transmission or of the transfer case that leads to the axle drive is consequently decoupled from the axle drive during the operation of the auxiliary power take-off, so that by way of the power take-off shaft a torque can be tapped off in order to drive the power take-off.

The drive aggregate of the motor vehicle can be in the form of an internal combustion engine or combustion engine, an electric motor, or a hybrid drive comprising a combustion engine and an electric motor.

The transmission is preferably an automatic or automated transmission, for example in the form of an automatic transmission, an automated step-by-step variable speed transmission, a dual-clutch transmission, a continuously variable power-split transmission, etc. For this the motor vehicle transmission can also consist of a plurality of transmission groups.

The motor vehicle is preferably a utility vehicle, such as a truck or even an agricultural or municipal utility vehicle, such as a fire-fighting vehicle.

The invention is now based on the technical principle that during uninterrupted use of the auxiliary power take-off, after the lapse of a defined time period a shift to a protective gear is carried out automatically in the transmission.

In other words, after the lapse of a defined first time period a forced shift to a protective gear is carried out in the transmission. In the present context a protective gear is understood to mean a transmission gear which is different from the transmission gear engaged during the uninterrupted operation of the auxiliary power take-off. Depending on the auxiliary unit being driven and depending on the power available from the drive aggregate, the automatic shift to be carried out automatically in accordance with the method according to the invention can be a downshift or an upshift.

For example, if for the uninterrupted operation of the auxiliary power take-off the sixth gear is engaged in the transmission, a shift can be carried out to the fifth or seventh gear or even to the fourth or eighth gear as the protective gear. Preferably, the shift is made to a transmission gear adjacent to the currently engaged transmission gear. The transmission gear to be engaged in the transmission for the operation of the auxiliary power take-off is preferably stored in the transmission control unit. For example, a maximum permitted transmission gear for the operation of the auxiliary power take-off can be stored in the transmission control unit. If during the operation of the auxiliary power take-off the maximum permitted transmission gear for the operation of the power take-off is already engaged in the transmission, then after the lapse of the defined time the forced shift into the protective gear is only allowed to be a downshift.

Since after the defined first time period a forced shift into a protective gear takes place in the transmission, the transmission elements involved in the power flow, such as gearwheels, disks or bearings, can be relieved of load. This works to prevent a shortening of the life of, or damage to the transmission.

The defined first time period after which the automatic gearshift to a protective gear should take place, can be chosen freely. The time period can depend, for example, on the type of auxiliary power take-off to be operated at the transmission output. For example, if a fire pump of a fire engine is to be operated as the auxiliary unit by the power take-off, the automatic shift to the protective gear should take place after a period of four hours.

The point in time at which the automatic gearshift into the protective gear should take place can be determined by a timer. For example, the timer can be started when an operating point of the auxiliary power take-off is in a torque category provided for this purpose. After the lapse of the defined time period or after reaching, or exceeding or falling below a specifiable threshold value for the timer, the automatic gearshift to the protective gear is carried out.

Thanks to the invention the useful life of the transmission can be made longer.

According to an advantageous further development, however, the transmission is only shifted into the protective gear for a specifiable, second time period. The specifiable second time period during which the protective gear is engaged in the transmission can be chosen freely and can for example amount to up to ten minutes and preferably two minutes. After the protective gear has been engaged in the transmission a second timer can be started, by means of which the time during which the protective gear is engaged in the transmission is determined. After the lapse of the specifiable second time period, or after reaching or exceeding or falling below a specifiable threshold value, the transmission is shifted to the previously engaged gear and the auxiliary power take-off is again operated in the previously engaged transmission gear. The timer is then reset.

This further development of the invention has the advantage that the power take-off is only operated in the protective gear engaged in the transmission for as long as is necessary to relieve the load on the transmission elements involved in the power flow. Thereafter, the power take-off can continue being operated in the transmission gear provided for the actual operation of the power take-off.

It can be provided that a vehicle operator can interrupt the operation of the auxiliary power take-off while the protective gear is engaged in the transmission. In the protective gear the auxiliary unit driven by the power take-off is no longer operated at the nominal power. Thus, the automatic gearshift into the protective gear can be interrupted by a vehicle operator when the gearshift is initiated at a point in time when the auxiliary unit has to be operated with nominal power. For example, the vehicle operator can interrupt the protective gear by a torque demand. The torque demand can be made by actuating an accelerator pedal more firmly. If a torque demand is detected while the protective gear is engaged, then the protective gear is disengaged and in the transmission the gear previously provided for operating the power take-off is re-engaged. The fact that an operation with the protective gear engaged in the transmission has been interrupted by the vehicle operator, can be recorded in a statistical memory. Then, at a later time the statistical memory and data stored therein, such as the time, date and frequency of the interruption of operation in the protective gear can be read out.

According to an advantageous further development, the automatic gearshift into the protective gear is carrier out already before the lapse of the defined first time period, if an auxiliary unit operated via the power take-off is being operated under reduced power.

As already mentioned earlier, a timer can be started when an operating point of the power take-off is in a torque category provided for the power take-off. According to this further development, it is provided that the automatic gearshift into the protective gear can already be carried out when the timer or time threshold value has not yet been reached or exceeded or fallen below, but the power take-off is being operated under reduced power. For this a defined third time period can also be taken into account, which is shorter than the first defined time period. In this way it can be provided that when the power take-off is operated under reduced power, the automatic gearshift into the protective gear only takes place after the lapse of the defined third time period, but already before the lapse of the defined first time period.

The power take-off is operated under reduced power when a vehicle operator reduces the torque, for example by releasing an actuated accelerator pedal. A torque reduction of the drive aggregate can be detected by means of torque sensors provided in the drive-train or with reference to sensors by means of which an angle of the accelerator pedal position or an opening angle of a throttle flap are detected.

If the auxiliary power take-off has been operated in the protective gear over the second time period provided for the protective gear, then in the transmission the original transmission gear is engaged again and the timers are reset. This has the advantage that the protective gear can already be engaged comparatively early on, and this in an operating phase of the power take-off in which operation in the protective gear is not troublesome.

For example, as already mentioned, when a fire pump of a fire-fighting vehicle is operated by means of the power take-off, the transmission can already be shifted to the protective gear if the fire pump has been operating continuously for more than two hours and an operation of the power take-off under reduced power is detected. If there is no operation under reduced power, then only after the lapse of four hours of uninterrupted operation of the power take-off is the forced gearshift to the protective gear carried out in the transmission.

If, due to operation under reduced power, the protective gear has been engaged in the transmission, it can then be provided that in the transmission the original gear is engaged again if the operator of the vehicle calls for a higher torque from the drive aggregate by actuating the accelerator pedal.

If an automatic shift to the protective gear takes place, it can be provided that a vehicle operator is correspondingly informed about the same. The fact that a protective measure has been activated or is active due to the prolonged operation of the power take-off can be indicated to the vehicle operator, for example, as text on a display. The display can be arranged in a monitor or instrument panel of the motor vehicle, for example on the dashboard.

According to an advantageous further development, it is provided that when the protective gear is engaged in the transmission, the drive aggregate is operated in such manner that the rotational speed of the power take-off shaft corresponds to the rotational speed of the power take-off shaft before the automatic gearshift. Thus, the power take-off is operated with a constant rotational speed. For this, the transmission control unit can call for a target rotational speed or a target torque from the engine control unit and thereby ensure that the rotational speed at the power take-off shaft remains constant even when the protective gear is engaged. If a downshift is carried out as the automatic gearshift, then it can consequently be provided that the rotational speed of the drive aggregate is correspondingly increased for the duration of the downshift. On the other hand, if an upshift is carried out as the automatic gearshift, then it can be provided that the rotational speed of the drive aggregate is reduced for the duration of the upshift. This makes it possible to store several driving profiles for the power take-off, according to the load.

The invention also relates to a control device designed to carry out the method according to the invention. The control device contains means that serve to carry out the method according to the invention. These means include hardware means and software means. The hardware means include data interfaces for the exchange of data with the assemblies of the drive-train involved in carrying out the method according to the invention. The hardware means also include a memory for data storage and a processor for data processing. The software means include program modules for carrying out the method according to the invention.

Thus, the control device for carrying out the method according to the invention comprises at least one receiving interface, which is designed for example to receive a signal from an operating element that indicates a demand from the driver to operate a power take-off, a signal that indicates that the vehicle is at rest, a signal from a position or path sensor from which a gear engaged in the transmission can be concluded, and a signal from a position or path sensor from which an actuation of the accelerator pedal is detected. The control unit also comprises an evaluation unit for evaluating the input signals received or the information of the input signals received. The control unit can compile and store internal statistical data about several torque categories. The torque categories can be defined, among other things, as a function of the power of the drive aggregate and the power of the power take-off. For example, three torque categories can be provided. With reference to received input signals or the information in received input signals, the control device determines which torque category the power take-off is being operated in and for how long the power take-off has already been operating in that torque category without interruption. After the lapse of a defined time period of uninterrupted operation of the power take-off, by way of a transmission interface the control device emits a corresponding control signal which authorizes a gearshift to a protective gear in the transmission. The defined time period can for example depend on which torque category the power take-off is being operated in. If during the operation of the power take-off the torque category is abandoned already before the lapse of the defined time period, then no gearshift to the protective gear takes place and a corresponding timer for that torque category is reset.

The aforesaid signals should be regarded only as examples and should not limit the invention. The input signals received and the control signals emitted can be transmitted by way of a vehicle bus, such as a CAN bus. The control device can for example be in the form of a central electronic control unit or an electronic transmission control unit.

The system according to the invention can also be incorporated as a computer program product which, when it is run on a processor of a control device, instructs the processor to carry out the associated process steps in accordance with the object of the invention. In this connection the object of the invention also includes a computer-readable medium, on which a computer program product as described above can be retrievably stored.

BRIEF DESCRIPTION OF THE DRAWINGS

Preferred further developments emerge from the subordinate claims and the description below. An example embodiment of the invention, to which it is not limited, is explained in greater detail with reference to the sole drawing. The sole drawing shows an example of a drive-train scheme of a motor vehicle in the form of a utility vehicle.

DETAILED DESCRIPTION OF THE PREFERRED EMBODIMENTS

The sole FIGURE shows a schematic drive-train of a motor vehicle in the form of a utility vehicle, with a drive aggregate 1 in the form of an internal combustion engine or combustion engine.

In addition, the motor vehicle comprises a transmission 2 and a transfer case 3, which are connected between the drive aggregate 1 and an axle drive 4.

The transmission 2 can for example be in the form of an automatic transmission or an automated manual transmission. When the transmission is designed as an automated manual transmission, as is known a clutch (not shown here) can be connected between the drive aggregate 1 in the form of an internal combustion engine and the transmission 2. When the clutch is open, the drive aggregate 1 is decoupled from the transmission 2, whereas in contrast when the clutch is closed, the drive aggregate 1 is coupled to the transmission 2.

The drive aggregate 1 engages with a transmission input shaft 6 of the transmission 2. The axle drive 4 is coupled to a drive output shaft 8 of the transfer case 3. Furthermore, a transmission output of the transmission 2 and a transmission input of the transfer case 3 are coupled to one another via a shaft 7. Consequently, the transfer case 3 can be built between the transmission 2 and the axle drive 4 in the cardan shaft line. The axle drive 4 can for example comprise a rear-axle differential.

The motor vehicle in the form of a utility vehicle further comprises at least one auxiliary power take-off (PTO) 5. The power take-off 5 concerned engages with a power take-off shaft 9 of the transfer case 3. Torque for driving the power take-off 5 can be applied to the power take-off shaft 9.

For example, the drive-train may be a drive-train of a fire-fighting vehicle. In that case, by way of the power take-off or power take-offs, auxiliary units such as pumps, foam proportioning systems or water cannons, or fire booms can be operated. The drive energy of the drive aggregate 1 must be matched optimally to the fire-fighting technology of the fire-fighting vehicle.

This power transfer can take place for example by way of a transfer case 3 in the form of a so-termed split-shaft transmission. By means of the split-shaft transmission all of the power from the drive aggregate 1 can be supplied to the fire-fighting auxiliary units. For this purpose, the axle drive 4 is decoupled via the split-shaft transmission and the drive power of the drive aggregate 1 is made available for operating the at least one power take-off 5. In this way the fire-fighting auxiliary units can be operated for long periods.

To operate the auxiliary units, a gear is engaged in the transmission 2 and the power take-off 5 is coupled to the power take-off shaft 9 of the transfer case 3 by means of a shifting element (not shown here), which can be an interlocking or a frictional shifting element.

In the event of uninterrupted operation of the power take-off, it is now provided that after the lapse of a defined time period, a forced gearshift into a protective gear is carried out automatically in the transmission 2.

In that way transmission elements can be relieved of load, so that shortening the life of or damage to the transmission can be prevented.

INDEXES

1 Drive aggregate
2 Transmission
3 Transfer case
4 Axle drive
5 Auxiliary power take-off
6 Transmission input shaft
7 Transmission output shaft
8 Transmission output shaft of the transfer case
9 Power take-off shaft of the transfer case

The invention claimed is:

1. A method for operating an auxiliary power take-off in a drive-train of a motor vehicle having at least a drive aggregate and an axle drive, and a transmission connected between the drive aggregate and the axle drive, the method comprising:
engaging an initial transmission gear in the transmission to operate the power take-off; and
during uninterrupted operation of the power take-off in the initial transmission gear in the transmission, after a lapse of a defined time period, automatically shifting to a protective gear in the transmission.

2. The method according to claim 1, further comprising only shifting the transmission to the protective gear for a specifiable time, and, after lapse of the specifiable time, automatically re-engaging the initial transmission gear.

3. The method according to claim 1, further comprising interrupting operation of the power take-off with the protective gear engaged in the transmission by a torque demand of an operator of the vehicle.

4. The method according to claim 1, further comprising carrying out the automatic shift to the protective gear, before the lapse of the defined time period, if an auxiliary unit driven by the power take-off is operated under reduced power.

5. The method according to claim 4, further comprising re-engaging the initial transmission gear in the transmission, if a higher torque from the drive aggregate, for operating the power take-off, is requested by an operator of the vehicle.

6. The method according to claim 1, further comprising informing an operator of the vehicle about the automatic shift into the protective gear.

7. The method according to claim 1, further comprising operating the drive aggregate in such manner that a rotational speed of a power take-off shaft, when the protective gear is engaged in the transmission, corresponds to a rotational speed of the power take-off shaft before the automatic shift to the protective gear.

8. A control device for operating an power take-off in a drive-train of a motor vehicle with at least a drive aggregate and a transmission connected between the drive aggregate and an axle drive, the control device comprises at least a receiving interface designed to receive input signals from drive-train components; an evaluation unit for evaluating the input signals received; and a sender interface for emitting control signals to drive-train components;
for the operation of the power take-off, the control device controlling an actuator system by which an initial transmission gear is engaged in the transmission, and, after lapse of a defined time period of uninterrupted power take-off operation, the control device activating the actuator system by which a protective gear is engaged in the transmission.

9. The control device according to claim 8, wherein the control device carries out, by control means, engaging an initial transmission gear in the transmission to operate the power take-off; and during uninterrupted operation of the power take-off in the initial transmission gear in the transmission, automatically shifting to the protective gear in the transmission after the lapse of the defined time period.

10. A computer program product with program code means which is stored on a computer-readable data carrier and which is run on a control device according to claim 8 such that when the computer program product is run on the control device for operating of the power take-off, the control device controls the actuator system by which the initial transmission gear is engaged in the transmission, and after lapse of the defined time period of uninterrupted power take-off operation, the control device activates the actuator system by which the protective gear is engaged in the transmission.

11. A computer program product with program code means which is stored on a computer-readable data carrier and which is run on a control device for operating an power take-off in a drive-train of a motor vehicle with at least a drive aggregate and a transmission connected between the drive aggregate and an axle drive, the control device having at least a receiving interface designed to receive input signals from drive-train components; an evaluation unit for evaluating the input signals received; and a sender interface for emitting control signals to drive-train components;
such that when the computer program product is run on the control device for operating of the power take-off, the control device controls an actuator system by which an initial transmission gear is engaged in the transmission, and after lapse of a defined time period of uninterrupted power take-off operation, the control device activates the actuator system by which a protective gear is engaged in the transmission.

* * * * *